Figure 1:
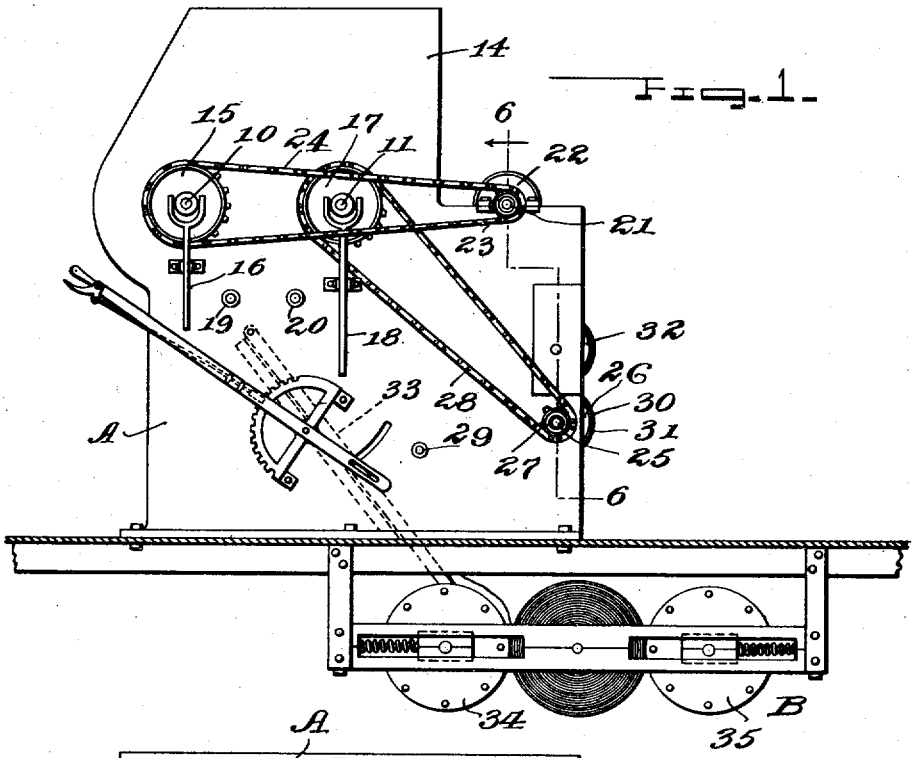

W. L. CLAYTON, G. R. BROWN & B. CLAYTON.

BAT ACCUMULATOR.

APPLICATION FILED MAY 1, 1914.

Reissued Sept. 1, 1914.

13,794.

4 SHEETS—SHEET 1.

Witnesses
N. N. Lybrand
S. Jay Teller

Inventors
George R. Brown
William L. Clayton
Benjamin Clayton
By H. H. Bliss
Attorney

THE NORRIS PETERS CO., PHOTO-LITHO., WASHINGTON, D. C.

W. L. CLAYTON, G. R. BROWN & B. CLAYTON.
BAT ACCUMULATOR.
APPLICATION FILED MAY 1, 1914.
Reissued Sept. 1, 1914.
13,794.
4 SHEETS—SHEET 2.
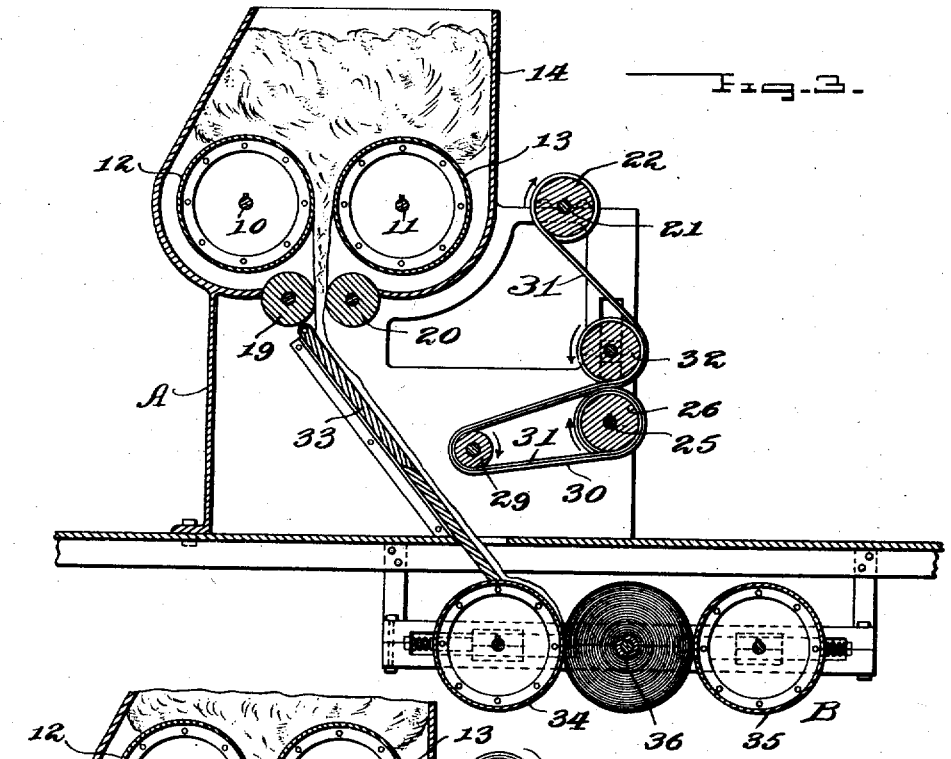
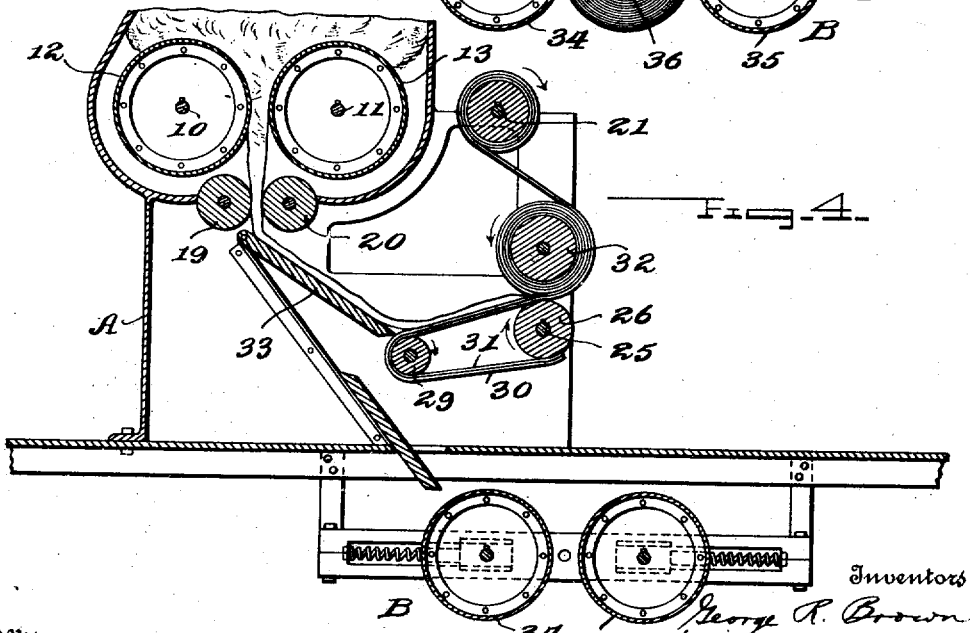
Witnesses
W. W. Lybrand
S. Jay Teller
Inventors
George R. Brown
William L. Clayton
Benjamin Clayton
By
H. A. Blies
Attorney
THE NORRIS PETERS CO., PHOTO-LITHO., WASHINGTON, D. C.

W. L. CLAYTON, G. R. BROWN & B. CLAYTON.
BAT ACCUMULATOR.
APPLICATION FILED MAY 1, 1914.
Reissued Sept. 1, 1914. 13,794.
4 SHEETS—SHEET 3.
Fig. 5.
Fig. 6.
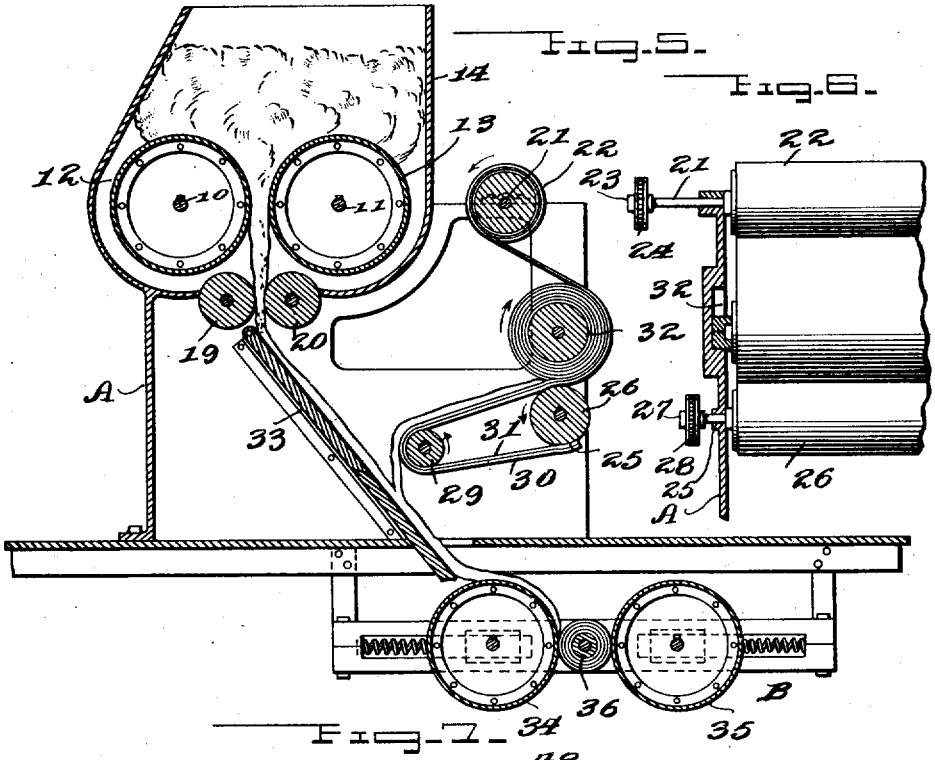
Fig. 7.
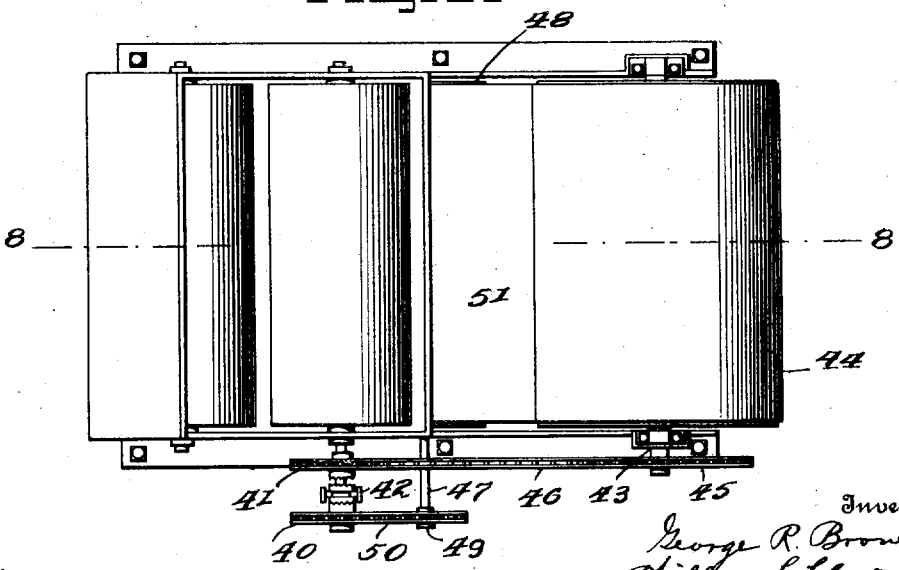
Witnesses
W. H. Lybrand
S. Jay Teller
Inventors
George R. Brown
William L. Clayton
Benjamin Clayton
By
H. S. T. Elias
Attorney
THE NORRIS PETERS CO., PHOTO-LITHO., WASHINGTON, D. C.

W. L. CLAYTON, G. R. BROWN & B. CLAYTON.

BAT ACCUMULATOR.

APPLICATION FILED MAY 1, 1914.

Reissued Sept. 1, 1914.

13,794.

4 SHEETS—SHEET 4.

Witnesses
H. H. Lybrand
S. Jay Teller

Inventors
George R. Brown
William L. Clayton
Benjamin Clayton

By H. H. Bliss
Attorney

B

THE NORRIS PETERS CO., PHOTO-LITHO., WASHINGTON, D. C

UNITED STATES PATENT OFFICE.

WILLIAM L. CLAYTON, GEORGE RAYMOND BROWN, AND BENJAMIN CLAYTON, OF OKLAHOMA, OKLAHOMA.

BAT-ACCUMULATOR.

13,794. Specification of Reissued Letters Patent. Reissued Sept. 1, 1914.

Original No. 1,048,289, dated December 24, 1912, Serial No. 696,986. Application for reissue filed May 1, 1914. Serial No. 835,775.

*To all whom it may concern:*

Be it known that we, WILLIAM L. CLAYTON, GEORGE R. BROWN, and BENJAMIN CLAYTON, citizens of the United States, residing at Oklahoma City, in the county of Oklahoma, State of Oklahoma, have invented certain new and useful Improvements in Bat-Accumulators; and we do hereby declare the following to be a full, clear, and exact description of the invention, such as will enable others skilled in the art to which it appertains to make and use the same.

This invention relates to bat accumulators for use in connection with the baling of cotton.

The object of the invention resides in the provision of an improved bat accumulator adapted to be disposed between a gin and baling press; said bat accumulator including an improved construction which will enable the bat to be stored in the accumulator during the removal of a full bale and the application of an empty bale core and then effect the delivery of said stored bat simultaneously with the bat from the bat former to the empty bale core, thus permitting the continuous operation of the gin and bat formers during the removal of a full bale from the press and the application of an empty bale core as previously referred to.

Stated more specifically, the objects of the invention are to provide a means supplemental to the accumulator and to the other parts mentioned for severing the bat and deflecting it to the accumulator; to provide an accumulator comprising a belt adapted to be wound and unwound from one to the other of two drums, both of which are mounted for rotation about fixed axes; and to provide other improvements which will be apparent from the following specification and claims.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein, like characters of reference denote corresponding parts in the several views, and in which—

Figure 2:
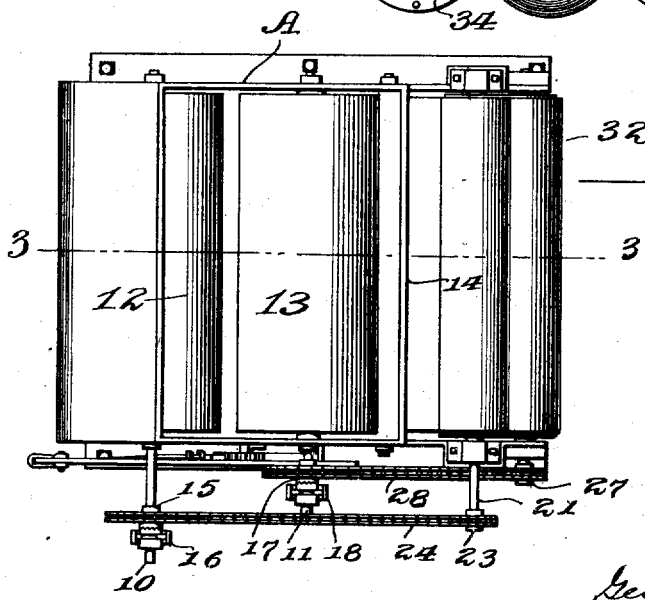
Figure 8:
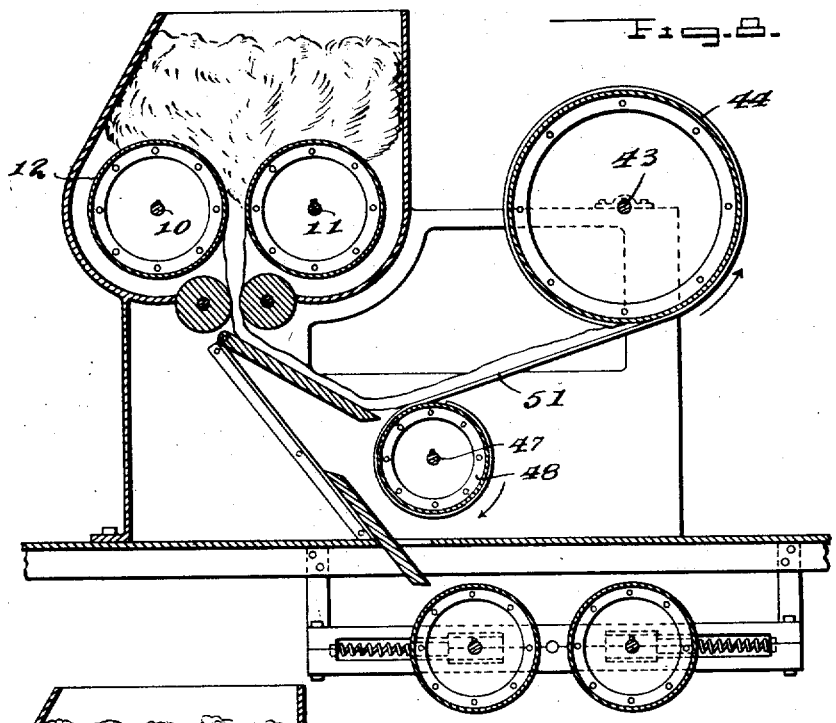
Figure 9:
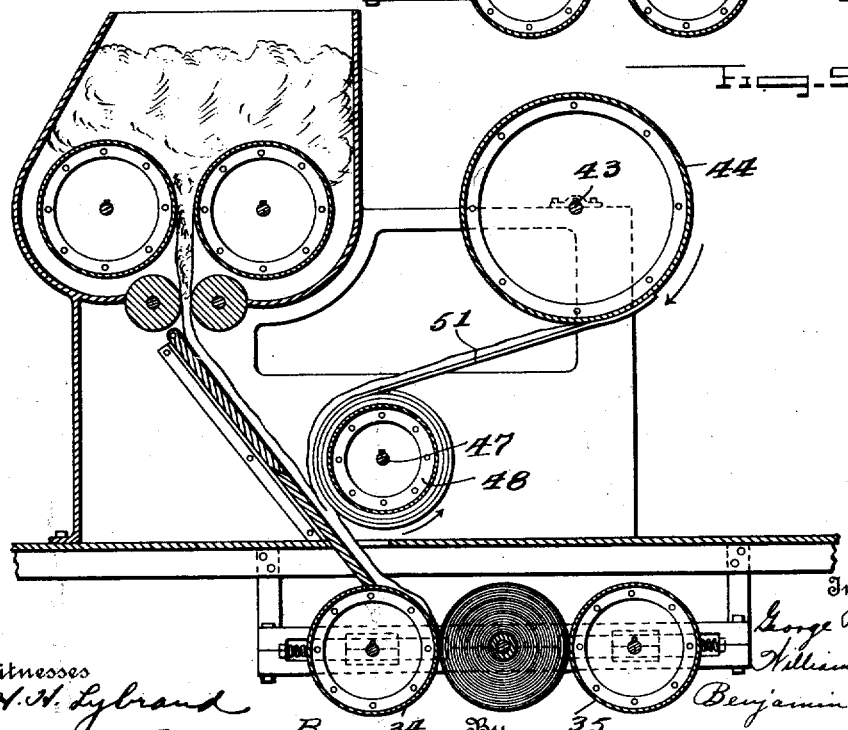

Figure 1 is a side elevation of a bat accumulator constructed in accordance with the invention, same being shown associated with a cylindrical bale press, Fig. 2 a plan view of what is shown in Fig. 1, Fig. 3, a section on the line 3—3 of Fig. 2 showing the various parts of the bat accumulator in the position they would occupy when the accumulator is idle and the bat is being fed directly from the bat forming rolls to the baling press, Fig. 4, a view similar to Fig. 3, showing the position of the various parts of the accumulator when same is storing bat during the removal of a full bale from the press and the application of an empty bale core, Fig. 5, a view similar to Fig. 3, showing the conditions existing in the accumulator when the movement of the parts thereof has been reversed in order to deliver accumulated bat therefrom to an empty bale core simultaneously with the delivery of the bat from the bat forming rolls to the bale core, Fig. 6, a section on the line 6—6 of Fig. 1, Fig. 7, a plan view of a modified form of the invention, Fig. 8, a section on the line 8—8 of Fig. 7, showing the position of the various parts of the accumulator when same is storing bat during the removal of the full bale from the press and the application of an empty bale core, and Fig. 9, a view similar to Fig. 8, showing the conditions existing in the accumulator when the movement of the parts thereof has been reversed in order to deliver accumulated bat therefrom to an empty bale core simultaneously with the delivery of the bat from the bat forming rolls to the bale core.

Referring to the drawings, A indicates the frame of the bat accumulator which has journaled therein at its upper end a pair of spaced shafts 10 and 11 disposed in the same horizontal plane. Fixed on these shafts 10 and 11 are bat forming rolls 12 and 13 respectively. These rolls are also disposed in spaced relation to each other and are adapted to receive the cotton from the gin (not shown) between them, said cotton being properly directed to the rolls 12 and 13 by means of a hopper 14 mounted in the frame A. Loosely mounted upon the shaft 10 is a sprocket wheel 15 adapted to be locked to said shaft by means of a lever operated clutch 16. Also loosely mounted on the shaft 11 is a sprocket wheel 17 adapted to be locked to said shaft by means of a lever operated clutch 18. Journaled in the frame A beneath the rolls 12 and 13 are smaller bat forming rolls 19 and 20 which are adapted to receive between them the bat delivered from the rolls 12 and 13 and additionally compress the bat before the passage of the latter to the press or to the accumulator as the case may be.

Journaled in the frame A at the top of the latter and adjacent the roll 13 is a shaft 21 which has fixed thereon a roller 22 and a sprocket wheel 23 connected to the sprocket wheel 15 by means of a sprocket chain 24. Also journaled in the frame A beneath the roller 22 a slight distance outwardly of the latter is a shaft 25 upon which is fixed a roll 26 and a sprocket wheel 27, the latter being connected to the sprocket wheel 17 by means of a sprocket chain 28. Journaled in the frame A inward of the roll 26 is a jockey roll 29 and traveling over this jockey roll 29 is a pair of overlying webs 30 and 31 respectively. The former of these webs has one end secured to the roll 26 and its other end secured to a roll 32 disposed between the rolls 26 and 22 and journaled in vertical sliding bearings mounted in the frame A. The web 31 also has one end thereof secured to the roller 26 and its other end secured to the roller 22, said web being adapted to pass over a portion of the periphery of the roller 32. Pivotally mounted in the frame A beneath the rollers 19 and 20 is a chute board 33. The free end of this chute board 33 is adapted to be adjusted from the position shown in Fig. 3 to the position shown in Fig. 4. In the position shown in Fig. 3, the chute board is adapted to direct the bat issuing from between the rolls 19 and 20 to the baling press indicated typically at B and shown as including presser rolls 34 and 35 between which is confined the bale core 36 which receives the bat thereon. In the position shown in Fig. 4 the free end of the chute board 33 is adjusted adjacent the roll 29 so that bat issuing from between the rolls 19 and 20 is severed and directed upon the web 30 and by this latter conveyed to and wrapped around the roll 26 as will hereinafter appear.

During the baling operation the bat moves directly from the bat forming rolls to the baling press B in the usual and well known manner, the clutches 16 and 18 and the rolls 22, 26, 29 and 32 during this operation being inactive. However, when the bale is complete and it is desired to remove same and substitute an empty core, the chute board 33 is adjusted to the position shown in Fig. 4 thereby severing the bat; and the clutch 16 thrown in so as to rotate the sprocket wheel 15. This rotation of the sprocket wheel 15 will in turn effect the rotation of the rollers 22, 26, 29 and 32 in the direction indicated by the arrows in Fig. 4 which will result in the bat and web 30 being wound upon the roller 22. Upon the completion of the application of an empty core, to the press B the chute board 33 is adjusted to the position shown in Fig. 5 after having first thrown out the clutch 16. The clutch 18 is then thrown in so as to effect the rotation of the sprocket wheel 17. The rotation of the sprocket wheel will in turn effect the rotation of the rolls 22, 26, 29 and 32 in the direction indicated by the arrows in Fig. 5, such rotation of said rolls serving to deliver the accumulated bat upon the roll 32 to the press B simultaneously with the delivery of the bat from the bat forming rolls, and at the same time winding both of the webs 30 and 31 upon the roll 26.

The modified form of the invention illustrated in Figs. 7, 8 and 9 is particularly applicable for use in connection with presses in which the bale can be removed and an empty core applied in a very short time and which therefore do not require the accumulation of a bat of very great length. In this form of the invention there is loosely mounted on the shaft 11 a pair of spaced sprocket wheels 40 and 41 and disposed between these sprocket wheels is a clutch 42 adapted to selectively throw in either of the sprocket wheels 40 or 41 and which may be so positioned as to be inactive with respect to both of said sprocket wheels. Journaled in the frame A at the top thereof and adjacent the roll 13 is a shaft 43 upon which is fixed a relatively large roller 44 and a sprocket chain 46. Journaled in the lower portion of the frame A between the shafts 11 and 43 is a shaft 47 which has fixed thereon a roller 48 and a sprocket wheel 49, the latter being connected to the sprocket wheel 40 by a sprocket chain 50. Adapted to wind and unwind upon and from the rolls 44 and 48 is a web 51 the terminals of which are anchored respectively to the peripheries of said rolls 44 and 48. In all other respects the modified form of the accumulator is similar to that previously described and will therefore not be referred to in detail herein.

In operation of the modified form of accumulator it will be noted that during the baling operation the clutch 42 is inactive with respect to the sprocket wheels 40 and 41 and that therefore the rolls 44 and 48 remain idle. However, when it is desired to remove a full bale the chute board is adjusted to the position shown in Fig. 8 and the clutch 42 thrown in to rotate the sprocket wheel 41. This rotation of the sprocket wheel 41 will in turn effect the rotation of the rolls 44 and 48 in the direction indicated by the arrows in Fig. 8 and the bat and web 51 will be wound upon the roll 44. When an empty core has been applied to the press and it is desired to deliver the accumulated bat thereto the clutch 42 is thrown out and the chute board 33 adjusted to the position shown in Fig. 9. The clutch 42 is then operated to throw in the sprocket wheel 40 and the rotation of this sprocket wheel will in turn cause the rolls 44 and 48 to rotate in the direction indicated by the arrows in Fig. 9 and deliver accumulated bat to the press simultaneously with the delivery of the bat from the bat forming rolls. This last named operation of the rolls 44 and 48 will also serve to wind the web 51 upon the roll 48 as is apparent.

What is claimed is:

1. In a bat former, the combination with a bat forming mechanism and a pressing mechanism for the bat delivered from said bat forming mechanism, of a supplemental receiver for the bat, means operable independently of the said supplemental receiver for severing the bat at times and deflecting it to the supplemental receiver, means for operating the supplemental receiver to accumulate the bat deflected thereto independent of the pressing mechanism, and means for discharging the bat from the supplemental receiver to the pressing mechanism.

2. In a bat former, the combination with a bat forming mechanism and a pressing mechanism for the bat delivered from said bat forming mechanism, of a rotatable receiver for the bat, means operable independently of the said supplemental receiver for severing the bat at times and deflecting it to the supplemental receiver, means for rotating the supplemental receiver to wind the bat thereon independent of the movements of the pressing mechanism, means for rotating said supplemental receiver to unwind the bat therefrom, and means for discharging the bat unwound from the supplemental receiver to the pressing mechanism.

3. The combination with a continuously acting bat forming mechanism and an intermittently-acting pressing mechanism for the bat delivered from said bat forming mechanism, of a supplemental receiver for the bat, means operable independently of the said supplemental receiver for severing the bat and deflecting it to the said receiver, and means for operating the supplemental receiver to cause it to accumulate the bat while the pressing mechanism is inactive and to discharge it to the pressing mechanism when the said mechanism is active.

4. The combination with a continuously-acting bat forming mechanism and an intermittently-acting pressing mechanism for the bat delivered from said bat forming mechanism, of a supplemental receiver for the bat, means operable independently of the said supplemental receiver for moving across the normal path of the bat to sever it and deflect it to the said receiver, and means for operating the supplemental receiver to cause it to accumulate the bat while the pressing mechanism is inactive and to discharge it to the pressing mechanism when the said mechanism is active.

5. The combination with a continuously-acting bat forming mechanism and an intermittently-acting pressing mechanism for the bat delivered from said bat forming mechanism, of a supplemental receiver for the bat, a guide for the bat having a part movable across the normal path of the bat to sever it and deliver it to the said supplemental receiver, and means for operating the supplemental receiver to cause it to accumulate the bat while the pressing mechanism is inactive and to discharge it to the pressing mechanism when the said mechanism is active.

6. The combination with a continuously-acting bat forming mechanism and an intermittently-acting pressing mechanism for the bat delivered from the bat forming mechanism, of a supplemental receiver for the bat comprising two rollers rotatable about fixed parallel axes and a belt secured at its ends to the rollers respectively so as to be wound from one to the other, and means serving at times to deflect the bat to the said supplemental receiver.

7. The combination with a continuously-acting bat forming mechanism and an intermittently-acting pressing mechanism for the bat delivered from said bat forming mechanism, of a supplemental receiver for the bat, comprising two rollers rotatable about fixed parallel axes and a belt secured at its ends to the rollers respectively so as to be wound from one to the other, a guide for the bat having a part movable across the normal path of the bat to sever it and deliver it to the said supplemental receiver, and means for operating the supplemental receiver to cause it to accumulate the bat while the pressing mechanism is inactive and to discharge it to the pressing mechanism when the said mechanism is active.

In testimony whereof, we affix our signatures, each in the presence of two witnesses.

WILLIAM L. CLAYTON.
GEORGE RAYMOND BROWN.
BENJAMIN CLAYTON.

Witnesses to the signature of William L. Clayton:

N. CUSTIS LAMMOND,
S. JAY TELLER.

Witnesses to the signatures of George Raymond Brown and Benjamin Clayton:

W. HANDY,
L. FLEMING, Jr.

Copies of this patent may be obtained for five cents each, by addressing the "Commissioner of Patents, Washington, D. C."